United States Patent [19]
Zheng

[11] Patent Number: 6,092,544
[45] Date of Patent: Jul. 25, 2000

[54] COLLAPSIBLE STRUCTURES HAVING OVERLAPPING SUPPORT LOOPS

[75] Inventor: Yu Zheng, Covina, Calif.

[73] Assignee: Patent Category Corp., Walnut, Calif.

[21] Appl. No.: 09/004,839

[22] Filed: Jan. 9, 1998

Related U.S. Application Data

[63] Continuation-in-part of application No. 08/717,408, Sep. 20, 1996, Pat. No. 5,941,265.

[51] Int. Cl.[7] .................................................. E04H 15/40
[52] U.S. Cl. ........................................ 135/125; 135/115
[58] Field of Search .................................... 135/115, 124, 135/125, 126, 128; 220/9.1, 9.2, 9.3

[56] References Cited

U.S. PATENT DOCUMENTS

| | | |
|---|---|---|
| 241,765 | 5/1881 | Wever . |
| 2,182,932 | 12/1939 | Sanford . |
| 2,638,399 | 5/1953 | Seymour . |
| 4,815,784 | 3/1989 | Zheng . |
| 5,163,451 | 11/1992 | Ivanovich et al. . |
| 5,249,592 | 10/1993 | Springer et al. . |
| 5,337,772 | 8/1994 | Habchi . |
| 5,385,165 | 1/1995 | Hazinski et al. . |
| 5,439,017 | 8/1995 | Brown . |
| 5,439,018 | 8/1995 | Tsai . |
| 5,452,934 | 9/1995 | Zheng . |
| 5,592,961 | 1/1997 | Chin . |
| 5,601,105 | 2/1997 | Blen et al. . |
| 5,628,338 | 5/1997 | Stumbo . |
| 5,645,096 | 7/1997 | Hazinski et al. . |
| 5,667,066 | 9/1997 | Simpson .............................. 220/9.3 X |
| 5,676,168 | 10/1997 | Price . |
| 5,800,067 | 9/1998 | Easter . |
| 5,816,278 | 10/1998 | Kim . |

FOREIGN PATENT DOCUMENTS

| | | |
|---|---|---|
| 2699459 | 6/1994 | France . |
| 9103744 | 6/1991 | Germany . |
| WO9416178 | 7/1994 | WIPO . |

OTHER PUBLICATIONS

Velcro Instruction Sheet (Mar. 1997).

Primary Examiner—Richard Chilcot
Attorney, Agent, or Firm—Raymond Sun

[57] ABSTRACT

Collapsible structures are provided having first and second flexible loop members, each loop member defining a closed loop and having a first edge and an opposing second edge. Each loop member is adapted to assume an expanded position and a collapsed position, with the two loop members overlapping each other at a first overlapping point along the first edges of the loop members, and at a second overlapping point along the second edges of the loop members. The loop members are further adapted to assume a deployed position in which one loop member is disposed at an angle with respect to the other loop member at the overlapping points, and with the loop members further defining six sides when in the deployed position. The structure also includes a flexible wall extending across at least two of the six sides.

13 Claims, 9 Drawing Sheets

COLLAPSIBLE STRUCTURES HAVING OVERLAPPING SUPPORT LOOPS

RELATED CASES

This is a continuation-in-part of Ser. No. 08/717,408, now U.S. Pat. No. 5,941,265 entitled "Collapsible Sunshields, Partitions and Shade Structures Having Overlapping Support Loops", filed Sep. 20, 1996, whose disclosure is incorporated by this reference as though fully set forth herein.

BACKGROUND OF THE INVENTION

1. Field of the Invention

The present invention relates to collapsible structures, and in particular, structures supported by resilient loop members maintained in overlapping relationship with each other. These structures may be twisted and folded to reduce the overall size of the structure.

2. Background Art

A number of prior art shade or tent structures have been provided for a wide variety of uses, such as for camping, for shade, or for play by children. Examples of these shade structures are illustrated in U.S. Pat. Nos. 3,990,463 to Norman, 4,825,892 to Norman, 5,038,812 to Norman, and 5,467,794 and 5,560,385 both to the present inventor. Each of these shade structures also uses one or more resilient loop members to support the structure in an expanded configuration. These shade structures may be twisted and folded to reduce the overall size of the shade structure.

SUMMARY OF THE INVENTION

The present invention provides basic principles which are effective in constructing a wide variety of collapsible structures, such as but not limited to containers, shade structures, play structures, and amusement structures. These collapsible structures have simple constructions, are easy to use, and provide the user with much variety in use and play.

The collapsible structure according to the present invention includes first and second flexible loop members, each loop member defining a closed loop and having a first edge and an opposing second edge. Each loop member is adapted to assume an expanded position and a collapsed position, with the two loop members overlapping each other at a first overlapping point along the first edges of the loop members, and at a second overlapping point along the second edges of the loop members. The loop members are further adapted to assume a deployed position in which one loop member is disposed at an angle with respect to the other loop member at the overlapping points, and with the loop members further defining six sides when in the deployed position. The structure also includes a flexible wall extending across at least two of the six sides.

The structures according to the present invention further includes first and second loop retaining sleeves for retaining the first and second loop members, respectively. The first and second loop retaining sleeves may be stitched to the fabric walls.

According to one embodiment of the present invention, a flexible wall extends across all six sides. The overlapping loop members define a hinge portion about which the first and second loop members are pivotable. The top edges of the loop members are urged towards each other when the first and second loop members are pivoted about the hinge portions. In addition, four of the six sides have a first edge that is defined by a side of the first loop member, and a second edge, opposite to the first edge, that is defined by a side of the second loop member. The other two sides have an overlapping point provided thereon. The two sides with the overlapping points are vertical sides.

According to another embodiment of the present invention, the two sides with the overlapping points represent top and bottom sides.

According to yet another embodiment of the present invention, the first and second overlapping points are provided at about the center of the first and second edges of the two loop members, and each of the two loop members includes a bottom edge that rests on the ground when the loop members are in the expanded position.

The structures according to the present invention can be folded and collapsed by urging the first and second edges of the two loop members towards each other about the first and second overlapping points to bring the first and second loop members together, and then twisting and folding the combined first and second loop members to form a plurality of concentric loop members to substantially reduce the size of the structure.

BEST MODES FOR CARRYING OUT THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The principles of the present invention are applicable to shade structures, containers, tents, play structures and other amusement structures, and shall be described herein in connection with such structures. However, it will be appreciated by those skilled in the art that the principles of the present invention are not so limited and can be applied to other structures for many different uses.

Figure 1A:
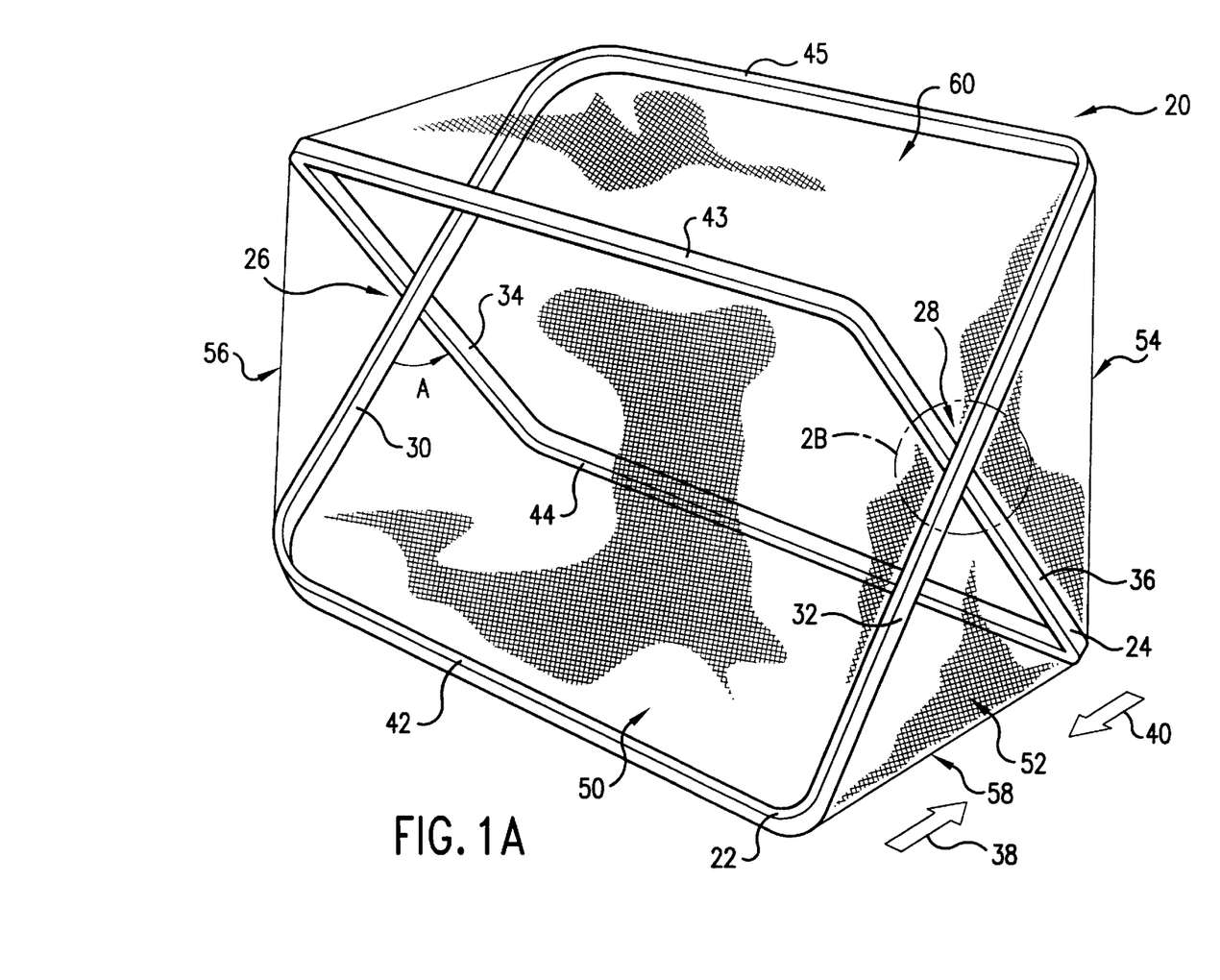
FIG. 1A is a perspective view of a collapsible structure according to a first embodiment of the present invention illustrated in an expanded configuration, with the loop members shown with greater emphasis.
Figure 2A:
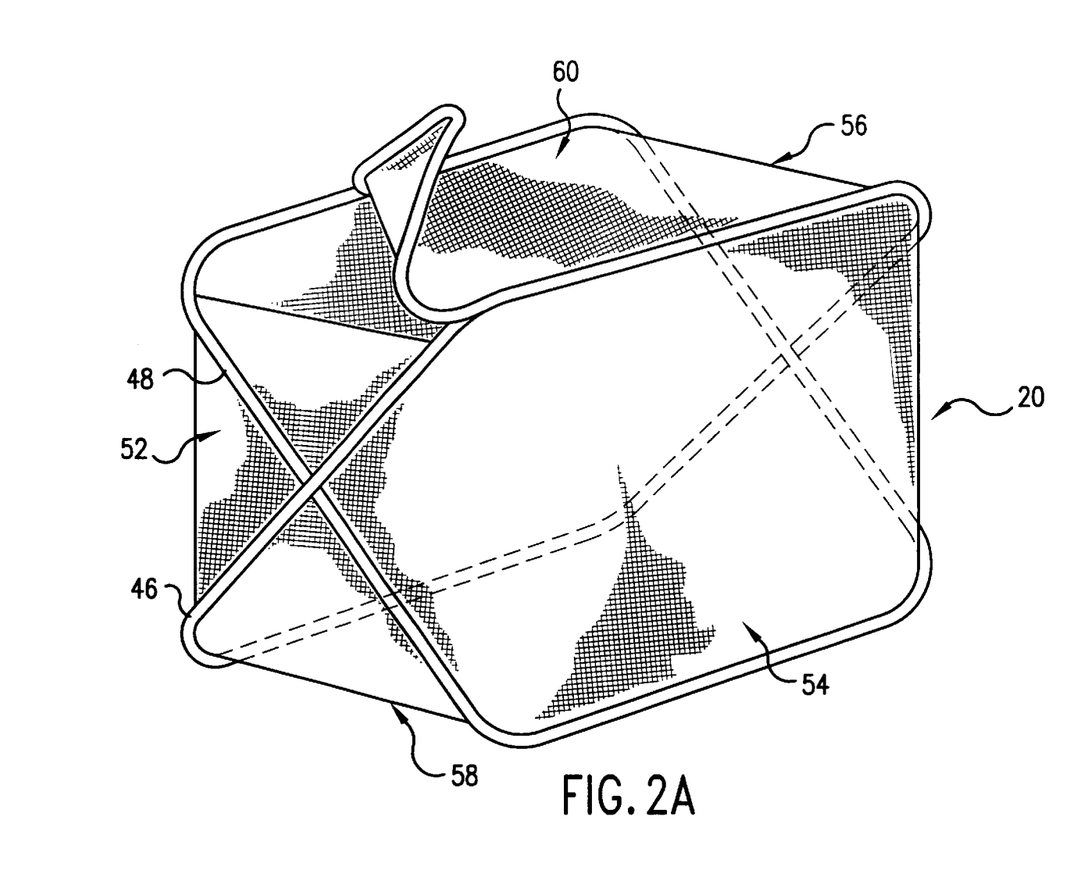
FIG. 2A is a perspective view of the structure of FIG. 1 illustrated in an expanded configuration.

FIGS. 1A and 2A illustrate a structure 20 according to a first embodiment of the present invention. The structure 20 has two overlapping or crossing resilient loop members 22 and 24 that together define the outer boundaries of the walls of the structure 20. Referring to FIG. 1A, each loop member 22 and 24 is provided as a closed resilient loop, either as a closed continuous loop or as a strip of material with both ends held together by a retaining connector or other conventional attachment mechanism to form a closed loop. The resilient loop members 22 and 24 are preferably made from a relatively strong springy material which is flexible enough to allow it to be coiled. The preferred material for the loop members 22 and 24 includes flat spring steel stock, and in particular, stainless steel, although plastic may also be used. Each closed loop member 22 and 24 is preferably substantially equal in size and symmetrically disposed, but it will be appreciated by those skilled in the art that the resilient loop members 22 and 24 may assume any variety of shapes and sizes, including but not limited to circular, polygonal or oval. Both resilient loop members 22 and 24 can even be provided in different sizes.

Figure 1B:
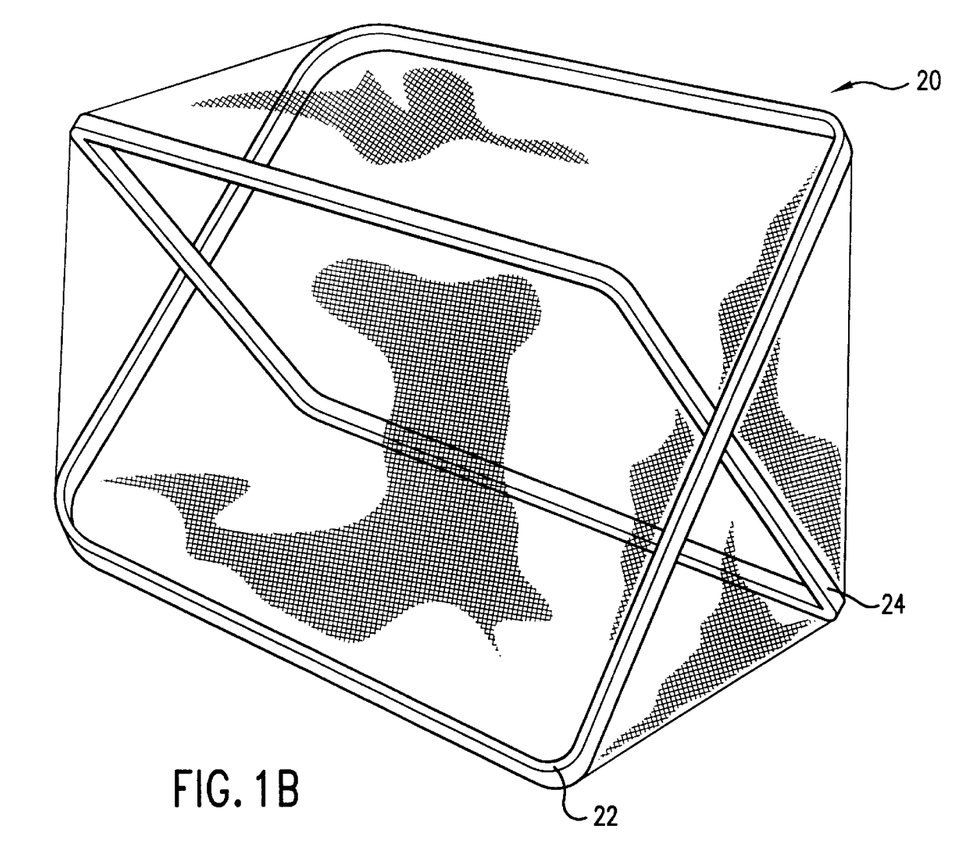
FIG. 1B is a perspective view of the structure of FIG. 1A illustrating a modification to the disposition of the loop members.

As illustrated in FIGS. 1A and 2A, the two loop members 22 and 24 overlap or cross-over each other at overlapping points 26 and 28. More specifically, the left side 30 of the first loop member 22 is interior to the left side 34 of the second loop member 24, and the right side 36 of the second loop member 24 is interior to the right side 32 of the first loop member 22. However, the second loop member 24 can also be completely contained within the first loop member 22, as shown in FIG. 1B. The overlapping point 26 is defined by the intersection or crossing of the left sides 30 and 34 of loop members 22 and 24, respectively, and the overlapping point 28 is defined by the intersection or crossing of the right sides 32 and 36 of loop members 22 and 24, respectively. The overlapping points 26 and 28 can be positioned anywhere along the left and right sides 30, 32, 34, 36 of the loop members 22, 24, although they are positioned at the about the center of the left and right sides 30, 32, 34, 36 in the structure 20. The two overlapping loop members 22 and 24 are pivotable about their overlapping points 26 and 28 between two positions, a first open position (see FIG. 1A) in which both loop members 22 and 24 are disposed at an angle A with respect to each other, and a second folded position in which the loop members 22 and 24 are folded towards each other (such as in the direction of arrows 38 and 40 in FIG. 1A) to overlie each other in generally the same plane. When in the first open position, the bottom sides 42 and 44 of the loop members 22 and 24, respectively, are adapted to rest on a surface to form a supporting base for the structure 20. In contrast, when in the second folded position, the bottom sides 42 and 44 (and the top sides 43 and 45) of the loop members 22 and 24, respectively, are urged against each other.

Figure 2B:
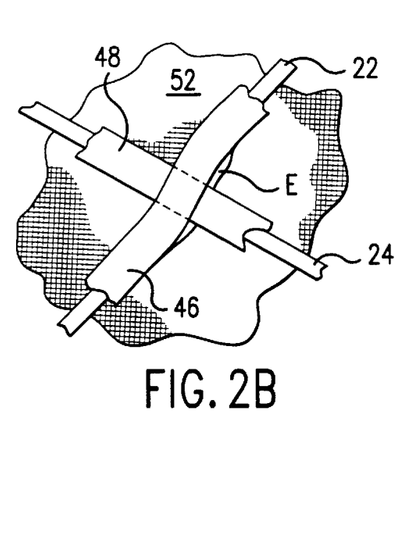
FIG. 2B is an expanded cut-away view of the section labeled 2B in FIG. 1A.

Each loop member 22 and 24 is retained in a loop retaining sleeve that extends around the entire loop member. Referring to FIGS. 2A and 2B, first and second loop retaining sleeves 46 and 48 are provided for the loop members 22 and 24, respectively, and are stitched to a fabric wall 52, which is described in greater detail hereinbelow. The structure of the sleeves 46 and 48 at the overlapping points 26 and 28 can be provided in one of several ways. In one embodiment, as shown in FIG. 2B, the second sleeve 48 is closed at the location of the overlapping point 28, while the first sleeve 46 is slightly exposed (see designation "E" in FIG. 2B) at the overlapping point 28 so that the loop member 22 is exposed thereat. Alternatively, the first sleeve 46 can be closed at the location of the overlapping point 26, while the second sleeve 48 can be slightly exposed at the overlapping point 26 so that the loop member 24 is exposed thereat. As another alternative, a small portion of the sleeves 46, 48 may be interrupted or disconnected adjacent the overlapping points 26 and 28 so as to expose the loop members 22 and 24 at these overlapping points 26 and 28. According to yet another alternative, the sleeves 46 and 48 can be connected to each other to form a "+" or cross-shaped sleeve portion at the overlapping points 26 and 28. According to a further alternative, the respective sleeves 44, 46 can be provided as completely closed sleeves that run uninterrupted throughout the closed loop of the loop members 22 and 24, as described in greater detail below in connection with FIG. 5B.

Thus, in each alternative, the loop members 22 and 24 are not connected or attached at the overlapping points 26 and 28 so as to allow the loop members 22 and 24 to pivot about these points. In addition, in each alternative, the loop members 22 and 24 pivot about the overlapping points 26 and 28 in the two directions illustrated by arrows 38 and 40 in FIG. 1A, with the overlapping points 26 and 28 together acting as hinge mechanisms when the loop members 22 and 24 are simultaneously pivoted about these points 26 and 28.

The loop members 22, 24 may be merely retained within the respective retaining sleeves 46, 48 without being connected thereto. Alternatively, the retaining sleeves 46, 48 may be mechanically fastened, stitched, fused, or glued to the respective loop members 22, 24 to retain them in position.

The structure 20 has six fabric walls 50, 52, 54, 56, 58 and 60 that are supported by the loop members 22, 24, when the structure 20 is in the open position, to form an enclosed space. The walls 50, 52, 54, 56 form the four vertical sides of the structure 20, with the wall 58 forming the floor or bottom wall, and the wall 60 forming the roof or top wall. The first and second sleeves 46, 48 are attached directly, such as by stitching or sewing, to the surfaces of the fabric walls 50, 52, 54, 56, 58 and 60. Specifically, the sleeves 46, 48 define two of the edges for each of the fabric walls 50, 54, 58 and 60. In particular, each of the four vertical sides 50, 52, 54, 56 has a first edge that is defined by a side of the sleeve 46 and its first loop member 22, and a second edge, opposite to the first edge, that is defined by a side of the sleeve 48 and its second loop member 24. In addition, the sleeves 46, 48 are attached (such as by stitching) to the surface of the fabric walls 52 and 56, where the overlapping points 26 and 28 are provided.

When the structure 20 is in its fully deployed configuration shown in FIG. 1A, the fabric walls 50, 52, 54, 56, 58 and 60 define the limits to which the two loop members 22, 24 can be pivoted away from each other (i.e., pivoted away in directions that opposite to the directions of arrows 38, 40).

The fabric walls 50, 52, 54, 56, 58 and 60 are preferably made from strong, lightweight materials and may include woven fabrics, sheet fabrics or even films. The fabric should be water-resistant and durable to withstand the wear and tear associated with rough treatment by children.

Figure 3:
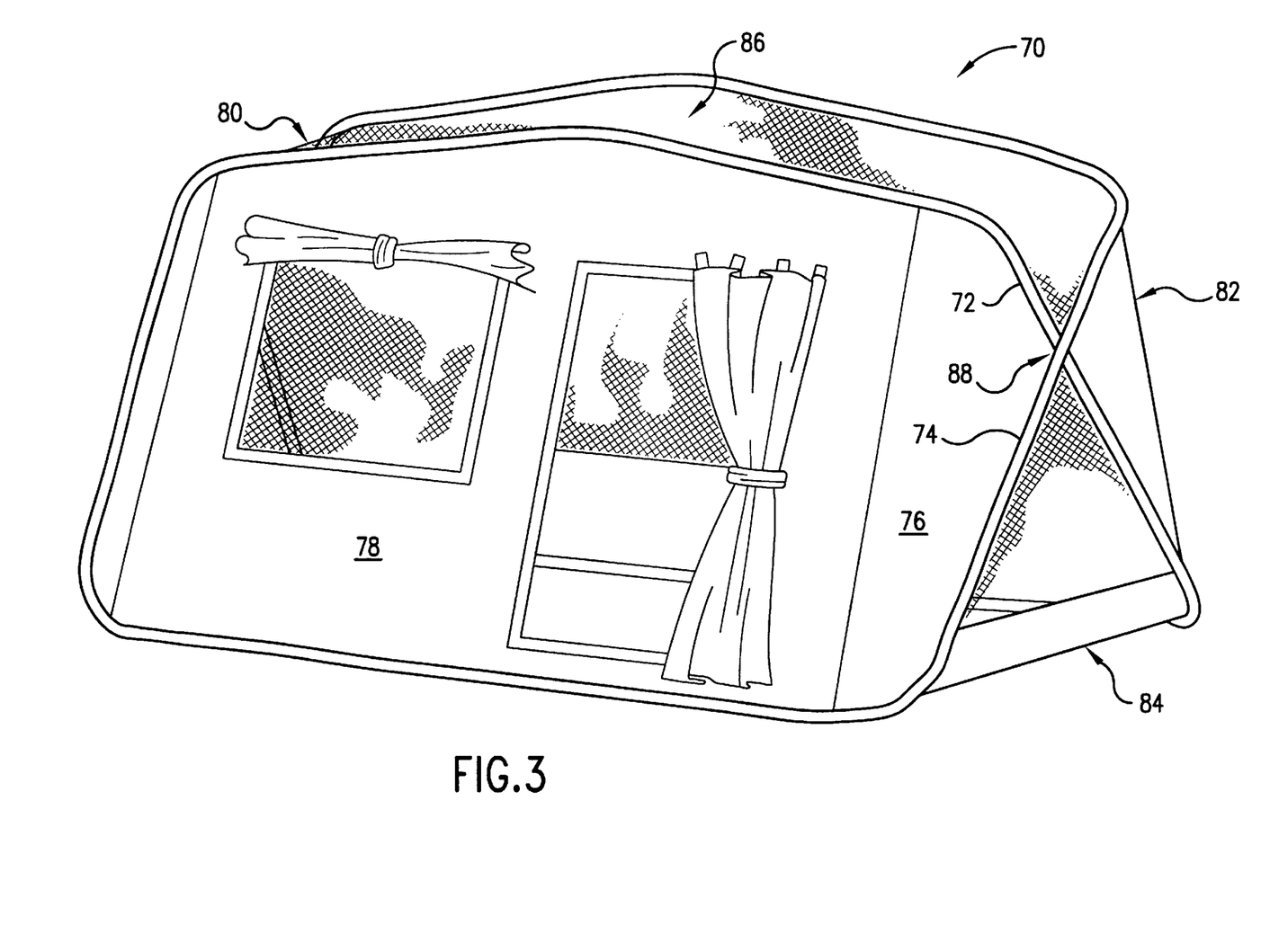
FIG. 3 is a perspective view of a collapsible structure according to a second embodiment of the present invention illustrated in an expanded configuration.

The structure 20 can be used in many applications, and several applications will be illustrated below. For example, the structure 20 is illustrated in FIG. 2A as a container or box having a peel-away top wall 60 that can be attached or connected to the other fabric walls by removable attachment mechanisms such as hooks, zippers, Velcro™, or other similar conventional mechanisms. As another example, the size and shape of the structure 20 can be modified to provide a tent structure 70, as illustrated in FIG. 3. The tent structure 70 also has a pair of overlapping loop members 72 and 74 that support six fabric walls 76, 78, 80, 82, 84 and 86 to define the tent structure 70.

Figure 4A:
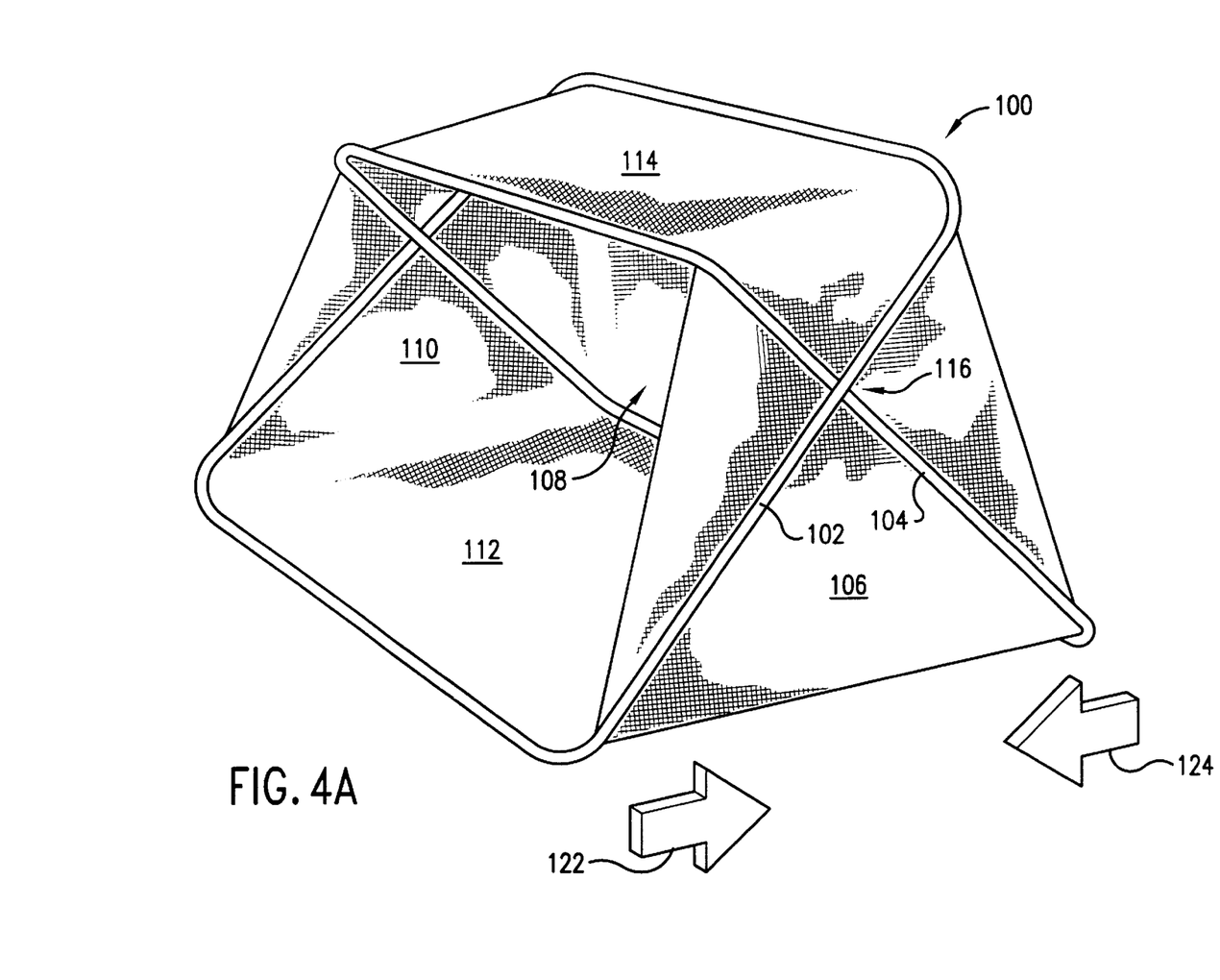
FIG. 4A is a perspective view of a collapsible structure according to a third embodiment of the present invention illustrated in an expanded configuration.

As yet another example, the size and shape of the structure 20 is modified to provide a cabana or shade structure 100, as illustrated in FIG. 4A. The shade structure 100 also has a pair of overlapping loop members 102 and 104 that support five fabric walls 106, 108, 110, 112 and 114 to define an enclosed space. The front side has no fabric wall, so that the entire front side can be used as an opening for ingress and egress. Thus, as illustrated in this embodiment, it is not necessary to provide a wall at all six sides of the structure. By omitting one or more side walls, a variety of different structures can be created.

In both the structures 70 and 100, the overlapping points (e.g., see point 88 in structure 70 and point 116 in structure 100) are not provided at the center of the left and right sides of the loop members 72, 74 and 102, 104, respectively. Instead, these overlapping points 88 and 116 are provided between the center and the top of the left and right sides of the loop members 72, 74 and 102, 104 so as to create structures 70, 100 having a wider base and a narrower top.

Figure 4B:
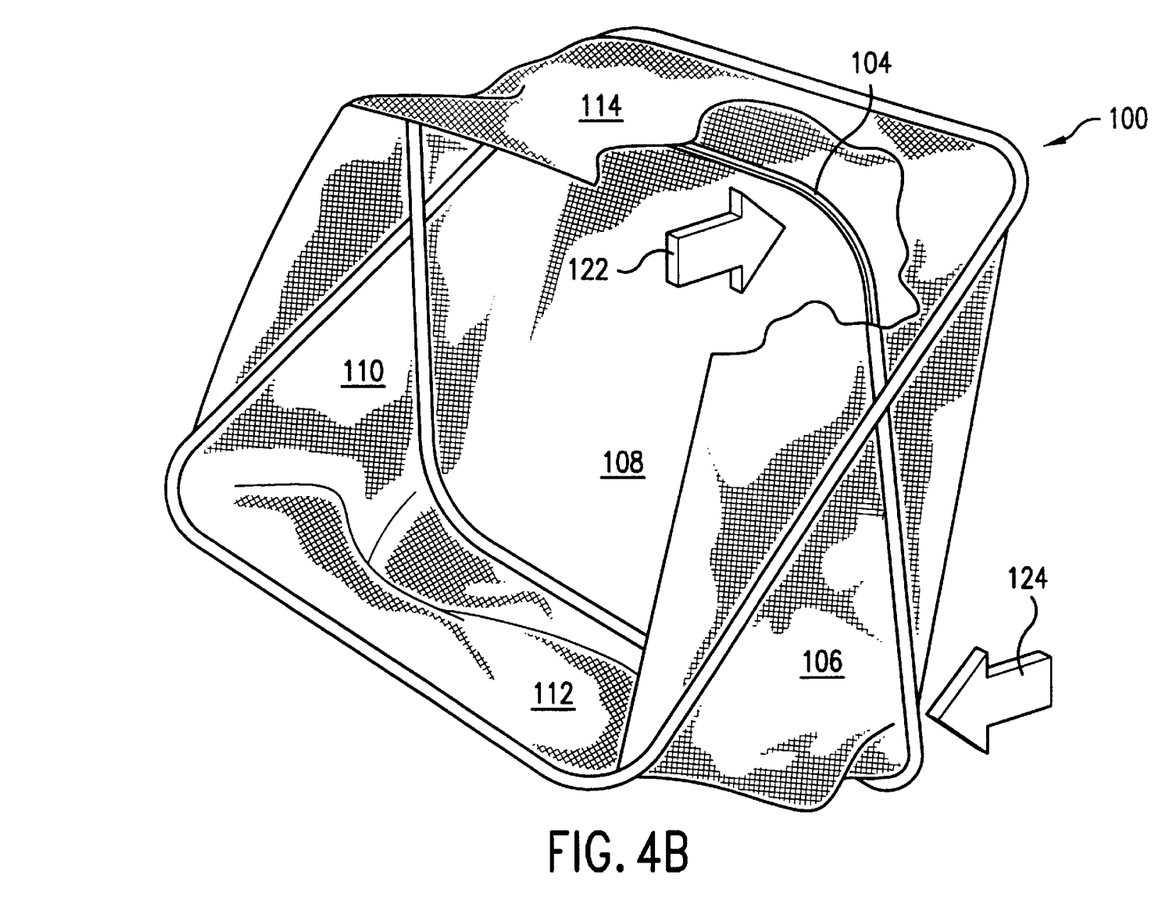
FIGS. 4B–4G illustrate how the structure of FIG. 4A is collapsed and folded to a reduced size.
Figure 4C:
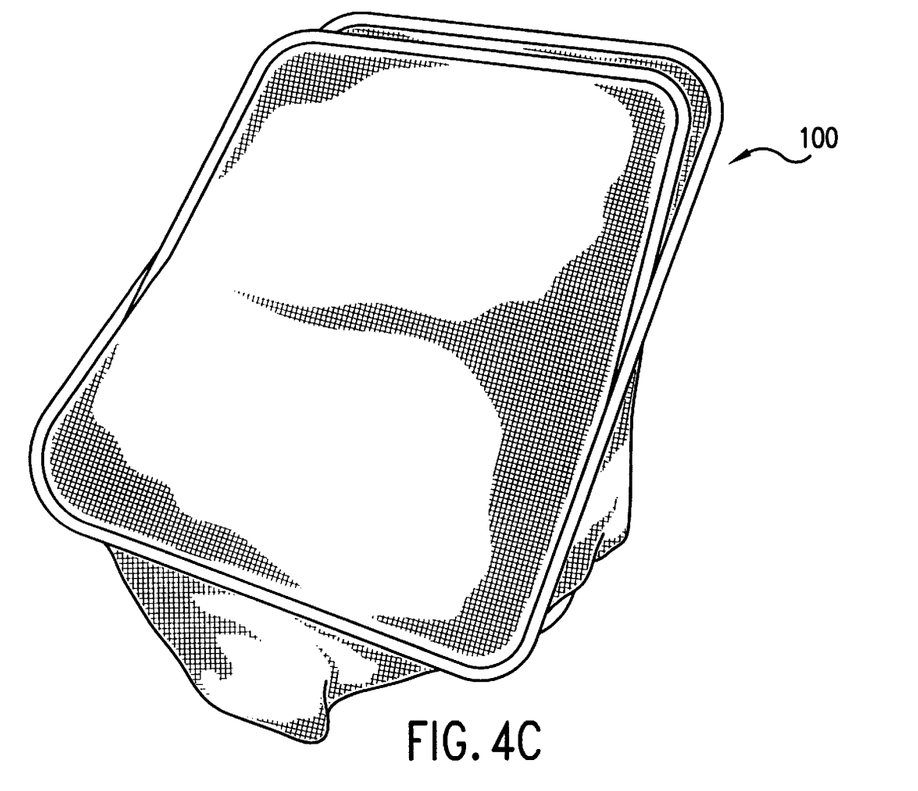
Figure 4D:
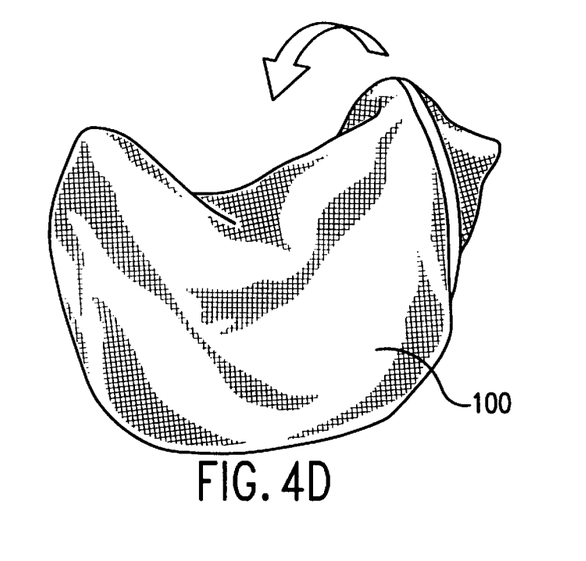
Figure 4E:
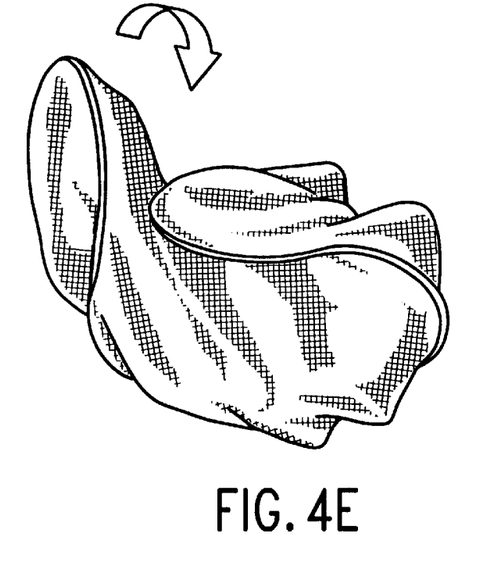
Figure 4F:
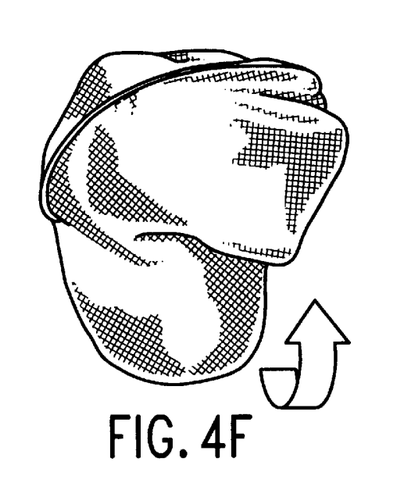
Figure 4G:
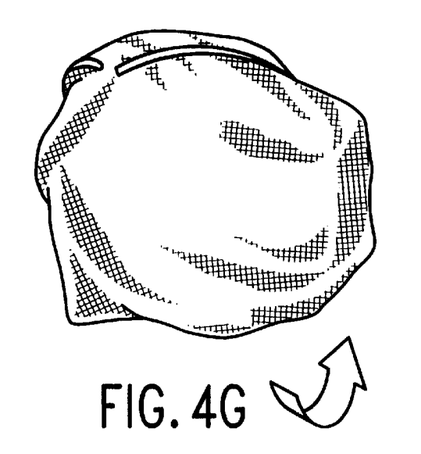

FIGS. 4B through 4G describe the various steps for folding and collapsing the structure 100 of FIG. 4A for storage. The first step consists of urging or folding the two loop members 102 and 104 towards each other (as shown by arrows 122 and 124 in FIGS. 4A and 4B) about the hinge mechanism of the overlapping points 116. The fabric walls 106, 108, 110, 112 and 114 will collapse onto each other as the loop members 102 and 104 are urged against each other, as shown in FIGS. 4B and 4C. When the two loop members 102 and 104 are urged together, the second step, shown in FIG. 4D, is to twist and fold the combined structure 100 to initially collapse the loop members and fabric into a smaller diameter. This can be followed by folding in the opposite side of the combined structure 100 upon the previous fold to further collapse the combined loop members (see FIG. 4E). As shown in FIG. 4F, the folding and collapsing is continued so that the size of the structure is a fraction of the diameter of the initial structure. FIG. 4G shows the loop members 102, 104 and fabric walls 106, 108, 110, 112, 114 collapsed on each other to provide for a small essentially compact configuration having a plurality of concentric closed loop rings and layers of fabric so that the collapsed structure has a size which is a fraction of the original size of the structure.

To deploy the structure 100 back to the expanded, fully deployed position, the loop members 102 and 104 are unfolded. The resiliency and spring force of the loop members 102, 104 will cause the loop members 102, 104 to spring open to the expanded configuration. The loop members 102, 104 can then be pivoted about their hinged overlapping points 116 to deploy the structure 100 in its original expanded configuration. When the loop members 102, 104 are fully deployed, the fabric walls 106, 108, 110, 112, 114 will assume their respective positions with respect to the supporting loop members 102, 104.

Figure 5A:
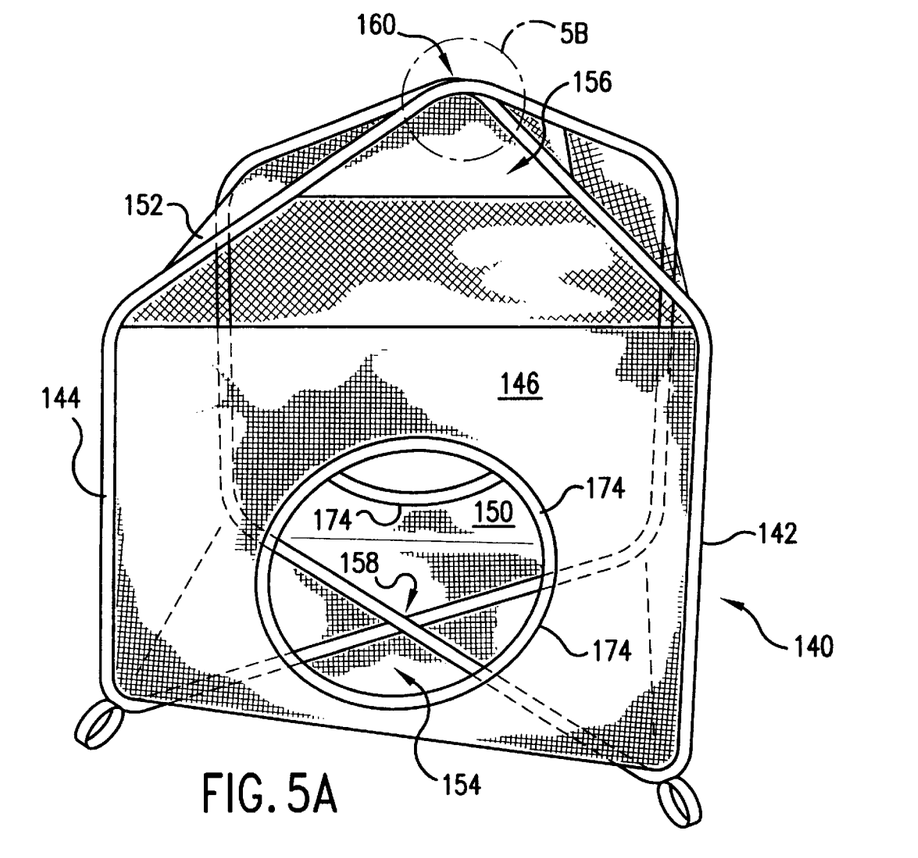
FIG. 5A is a perspective view of a collapsible structure according to a fourth embodiment of the present invention illustrated in an expanded configuration.

The structures 20, 70 and 100 are illustrated as having their overlapping points provided along opposing side walls. However, it is also possible to provide structures supported by two overlapping loop members where the overlapping points are provided at the opposing top and bottom walls (i.e., these could be the roof and floor, respectively). An example is illustrated in FIG. 5A, where the shade structure 140 has a pair of overlapping loop members 142 and 144 that support four vertical side fabric walls 146, 148 (not shown), 150, 152 to define an enclosed space, as well as a floor fabric 154 and a domed or raised roof fabric 156. As an alternative, the roof fabric 156 can be made up of extensions of (i.e., the same piece as) the four vertical side fabric walls 146, 148, 150, 152 up to the overlapping point 160.

The construction of the structure 140 can be essentially the same as structure 20, except that the structure 20 has been tilted by ninety degrees so that the overlapping points 158 and 160 are provided at the floor 154 and the roof 156, respectively. By providing the overlapping points 158 and 160 at the floor 154 and the roof 156, respectively, it is possible to provide the loop members 142, 144 with a slight bend at the overlapping point 160 at the roof 156 so as to create a domed or raised roof 156.

Figure 5B:
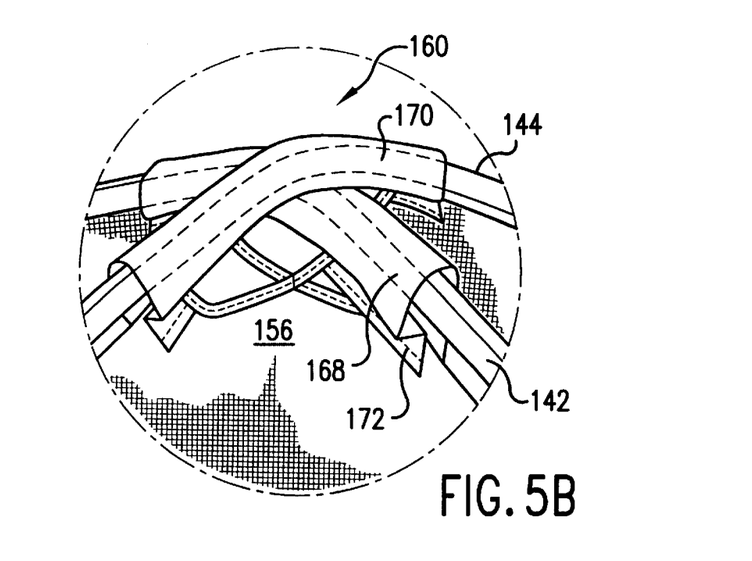
FIG. 5B is an expanded cut-away view of the section labeled 5B in FIG. 5A.

The overlapping point 160 at the roof 156 is illustrated in greater detail in FIG. 5B. Loop members 142 and 144 are retained in first and second loop retaining sleeves 168 and 170, respectively. Each sleeve 168, 170 is provided as a completely closed sleeve that runs uninterrupted throughout the closed loop of the loop members 142, 144. In addition, each sleeve 168, 170 is stitched or sewn to the roof fabric 156 along stitch lines 172. The structure of the overlapping point 158 can be the same. Thus, as described above, the loop members 142 and 144 are not connected or attached at the overlapping points 158 and 160 so as to allow the loop members 142 and 144 to pivot about these points, and for the overlapping points 158 and 160 to act as hinge mechanisms when the loop members 142 and 144 are simultaneously pivoted about these points 158 and 160.

The structure 140 can be provided with openings 174 that allow ingress and egress to the enclosed space defined by the four side walls 146, 148, 150, 152. Thus, the structure 140 can be used as a play structure for children.

The structures 20, 70 and 140 can also be folded and collapsed according to the method illustrated in connection with FIGS. 4B–4G. In addition, the structures 20, 70 and 140 can also be deployed to their original expanded positions according to the method described above in connection with structure 100.

All the structures according to the present invention are collapsible into smaller structures for convenient transportation and storage. In addition, it is possible to combine a plurality of the structures to provide structures having different sizes and configurations, thereby increasing the variety of use and play.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible structure, comprising:

first and second flexible loop members, each loop member defining a closed loop and having a first edge and an opposing second edge, each loop member adapted to assume an expanded position and a collapsed position, with the two loop members overlapping each other at a first overlapping point at about the center of the first edges of the loop members, and at a second overlapping point at about the center of the second edges of the loop members;

wherein the loop members are adapted to assume a deployed position in which one loop member is disposed at an angle with respect to the other loop member at the overlapping points, and with the loop members further defining at least four sides when in the deployed position with the loop members being twisted and folded into a smaller configuration when in the collapsed position; and a flexible wall having portions permanently attached to the loop members and extending across portions of at least two of the four sides.

2. The structure of claim 1, wherein four of the four sides have a first edge that is defined by a side of the first loop member, and a second edge, opposite to the first edge, that is defined by a side of the second loop member.

3. The structure of claim 1, wherein the two sides with the overlapping points represent top and bottom sides.

4. The structure of claim 1, wherein a flexible wall extends across four sides.

5. The structure of claim 1, wherein the overlapping loop members define a hinge portion about which the first and second loop members are pivotable.

6. The structure of claim 5, wherein each of the first and second loop members further includes a top edge, and wherein the top edges of the loop members are urged towards each other when the first and second loop members are pivoted.

7. The structure of claim 5, wherein the first and second edges of the two loop members are urged towards each other about the first and second overlapping points to bring the first and second loop members together, and wherein the overlaying loop members are collapsible to the collapsed positions by twisting and folding to form a plurality of concentric rings to substantially reduce the size of the structure in the collapsed position.

8. The structure of claim 1, further including first and second loop retaining sleeves for retaining the first and second loop members, respectively.

9. The structure of claim 8, wherein the first and second loop retaining sleeves are stitched to the fabric walls.

10. The structure of claim 1, wherein at least one of the sides has an opening.

11. The structure of claim 1, wherein each of the two loop members includes a bottom edge that rests on the ground when the loop members are in the expanded position.

12. The structure of claim 1, wherein the second loop member is retained inside the first loop member.

13. The structure of claim 1, wherein the fabric wall defines the limits to which the first and second loop members can be pivoted away from each other.

* * * * *